(12) United States Patent
Huber et al.

(10) Patent No.: US 11,578,995 B2
(45) Date of Patent: Feb. 14, 2023

(54) SENSOR ARRANGEMENT FOR ANGLE DETECTION AND MANUAL TRANSMISSION

(71) Applicant: KNORR-BREMSE Systeme fuer Nutzfahrzeuge GmbH, Munich (DE)

(72) Inventors: Christian Huber, Munich (DE); Juergen Schudy, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 592 days.

(21) Appl. No.: 16/222,456

(22) Filed: Dec. 17, 2018

(65) Prior Publication Data

US 2019/0120658 A1 Apr. 25, 2019

Related U.S. Application Data

(63) Continuation of application No. PCT/EP2017/064470, filed on Jun. 14, 2017.

(30) Foreign Application Priority Data

Jun. 17, 2016 (DE) .................... 10 2016 111 097.3

(51) Int. Cl.
*G01D 5/14* (2006.01)
*F16H 61/00* (2006.01)
(Continued)

(52) U.S. Cl.
CPC ............. *G01D 5/145* (2013.01); *F16H 59/70* (2013.01); *F16H 61/0006* (2013.01);
(Continued)

(58) Field of Classification Search
CPC ................................................ F16H 2061/122
See application file for complete search history.

(56) References Cited

U.S. PATENT DOCUMENTS 4,779,490 A * 10/1988 Milunas ................. F16H 59/36
477/115
5,203,418 A * 4/1993 Gibson ................. E21B 47/022
175/45
(Continued)

FOREIGN PATENT DOCUMENTS

CN 102607501 A 7/2012
CN 103906996 A 7/2014
(Continued)

OTHER PUBLICATIONS

Chinese-language Office Action issued in Chinese Application No. 201780050027.3 dated Jul. 15, 2020 with English translation (11 pages).
(Continued)

*Primary Examiner* — Victor L MacArthur
*Assistant Examiner* — Gregory T Prather
(74) *Attorney, Agent, or Firm* — Crowell & Moring LLP

(57) ABSTRACT

A sensor arrangement detects an angle of an actuator which is rotationally arranged on a support. The arrangement includes a first sensor element and a second sensor element. The first sensor element can be coupled to the actuator in order carry out a movement with respect to the support in accordance with a rotation of the actuator. The second sensor element can be rotationally fixed on the support and can be coupled to the first sensor element in order to produce, when rotating the actuator and a thus resulting movement between the first sensor element and the second sensor element, a sensor signal which is dependent on the rotation carried out by the actuator.

8 Claims, 2 Drawing Sheets

(51) Int. Cl.
*F16H 61/12* (2010.01)
*F16H 59/70* (2006.01)
*F16H 61/02* (2006.01)

(52) U.S. Cl.
CPC ......... *F16H 61/0248* (2013.01); *F16H 61/12* (2013.01); *F16H 2061/122* (2013.01); *F16H 2061/1284* (2013.01)

(56) References Cited

U.S. PATENT DOCUMENTS

| | | | | |
|---|---|---|---|---|
| 5,867,092 | A * | 2/1999 | Vogt | G01D 5/2497 340/456 |
| 5,878,624 | A * | 3/1999 | Showalter | F16H 63/304 74/473.37 |
| 6,155,126 | A * | 12/2000 | Vogt | F16H 59/70 74/335 |
| 6,211,794 | B1 * | 4/2001 | DeSoto | F16H 59/70 340/453 |
| 6,393,928 | B1 * | 5/2002 | Watanabe | F16H 61/0403 74/336 R |
| 6,422,336 | B1 | 7/2002 | Abele et al. | |
| 6,472,878 | B1 * | 10/2002 | Bruchmann | G01R 15/202 324/117 H |
| 6,515,472 | B2 | 2/2003 | Wurn et al. | |
| 7,023,203 | B2 * | 4/2006 | Miyashita | G01D 5/145 324/207.25 |
| 8,577,634 | B2 | 11/2013 | Donovan et al. | |
| 11,359,938 | B2 * | 6/2022 | Coyne | G01D 5/145 |
| 2001/0003250 | A1 * | 6/2001 | Ogami | F16H 61/28 74/335 |
| 2005/0080527 | A1 * | 4/2005 | Tao | F16H 59/38 701/31.1 |
| 2006/0011008 | A1 * | 1/2006 | Hara | F16H 63/32 74/473.36 |
| 2007/0028709 | A1 * | 2/2007 | Futamura | G01D 5/145 74/335 |
| 2008/0202853 | A1 * | 8/2008 | Ogami | F16H 59/36 184/6.12 |
| 2011/0080162 | A1 * | 4/2011 | Steinich | G01B 7/30 324/207.25 |
| 2014/0222364 | A1 | 8/2014 | Foletto et al. | |
| 2014/0232039 | A1 | 8/2014 | Minematsu et al. | |
| 2015/0068341 | A1 * | 3/2015 | Andreasen | F16H 61/0403 74/473.11 |
| 2015/0362335 | A1 | 12/2015 | Spitzer et al. | |
| 2016/0365771 | A1 * | 12/2016 | Kokubo | H02K 7/116 |
| 2017/0284828 | A1 * | 10/2017 | Rodger | H02K 11/21 |
| 2018/0284758 | A1 * | 10/2018 | Celia | G05B 23/0286 |
| 2018/0313371 | A1 * | 11/2018 | Steinich | G01D 5/145 |
| 2019/0174207 | A1 * | 6/2019 | Cella | H04Q 9/00 |
| 2019/0264803 | A1 * | 8/2019 | Matsukawa | F16H 61/12 |
| 2020/0124166 | A1 * | 4/2020 | Hanslmeier | F16H 61/2807 |
| 2020/0248794 | A1 * | 8/2020 | Groetzinger | F16H 63/32 |

FOREIGN PATENT DOCUMENTS

| | | |
|---|---|---|
| CN | 204061845 U | 12/2014 |
| DE | 198 28 513 A1 | 12/1999 |
| DE | 199 08 036 A1 | 8/2000 |
| DE | 101 06 056 A1 | 8/2002 |
| DE | 10 2004 052 797 A1 | 5/2006 |
| DE | 602 02 500 T2 | 5/2006 |
| DE | 10 2008 051 479 A1 | 3/2010 |
| DE | 10 2010 042 023 A1 | 4/2012 |
| DE | 10 2010 062 776 A1 | 6/2012 |
| DE | 11 2011 104 425 T5 | 9/2013 |
| DE | 10 2014 004 452 A1 | 10/2015 |
| EP | 1 381 148 A2 | 1/2004 |

OTHER PUBLICATIONS

International Search Report (PCT/ISA/210) issued in PCT Application No. PCT/EP2017/064470 dated Nov. 24, 2017 with English translation (seven (7) pages).
German-language Written Opinion (PCT/ISA/237) issued in PCT Application No. PCT/EP2017/064470 dated Nov. 24, 2017 (eight (8) pages).
German-language Search Report issued in counterpart German Application No. 10 2016 111 097.3 dated Feb. 22, 2017 (10 pages).
German-language European Office Action issued in European Application No. 17 732 831.7 dated Aug. 10, 2020 (13 pages).

* cited by examiner

SENSOR ARRANGEMENT FOR ANGLE DETECTION AND MANUAL TRANSMISSION

CROSS REFERENCE TO RELATED APPLICATIONS

This application is a continuation of PCT International Application No. PCT/EP2017/064470, filed Jun. 14, 2017, which claims priority under 35 U.S.C. § 119 from German Patent Application No. 10 2016 111 097.3, filed Jun. 17, 2016, the entire disclosures of which are herein expressly incorporated by reference.

BACKGROUND AND SUMMARY OF THE INVENTION

The present invention relates to a sensor arrangement for angle detection in a manual transmission and, in particular, to a sensor arrangement for sensing a tilt fork of a manual transmission, in particular of a utility vehicle.

Utility vehicle designs (e.g. for utility vehicles in local transportation and long-distance transportation, distribution transportation as well as for overland transportation and coach transportation) frequently have manual transmissions with a plurality of gears which are manufactured with a group construction method. In utility vehicles, this design is being increasingly used for automated manual transmissions, wherein theoretically different degrees of automation can be carried out. Depending on the embodiment, the starting process, the activation of the clutch and the gear selection, can be carried out automatically in this context. In the case of manual transmissions, none of these processes is automated. In partially automated manual transmissions, at least one of these processes is automated, and in fully automatic shift operations, all the processes are carried out in an automated fashion.

Therefore, there is a need for adapted activation devices for an automated starter clutch, automated coupling during shifting, and automated gear selection during a motor management process. The most precise sensing of the positions of shift elements is of essential importance for shift automation, in order as a result to optimize further automated shift sequences and to increase the efficiency.

In known conventional systems, the positions of shift elements in manual transmissions are determined by sensing linear displacements. Such displacements represent, for example, a desired actuator travel (for example, for a shift fork) and can be sensed, for example, by use of a piston position within a cylinder.

In an automated manual transmission, angular settings are sensed by one or more tilt forks and are passed on to a transmission control unit (TCU). It is important in this context to determine the position of the tilt fork (or forks) as precisely as possible and to reduce inaccuracies in the measurement chain. Such inaccuracies occur, for example, as a result of wear, as a result of play, elasticities owing to rigidities, and thermal expansion.

Therefore, there is a need for a sensor arrangement which does not have the abovementioned disadvantages or limitations.

This technical problem is solved by a sensor arrangement and a manual transmission in accordance with embodiments of the invention.

The present invention provides a sensor arrangement which is suitable for sensing angles of a rotatable actuator relative to a mount, wherein the actuator is rotatably arranged on the mount. The sensor arrangement comprises (at least) one first sensor element and (at least) one second sensor element. The first sensor element can be coupled to the actuator in order to carry out a movement (e.g. a rotation) relative to the mount in response to a rotation of the actuator. The second sensor element can be secured in a rotationally fixed fashion to the mount and can be coupled to the first sensor element, in order to generate a sensor signal when the actuator rotates and there is a resulting relative movement (e.g. rotation) between the first sensor element and the second sensor element, which sensor signal depends on the rotation carried out by the actuator.

The actuator and the mount do not need to be part of the sensor arrangement. The actuator can be, for example, a shift fork of a manual transmission to which the sensor arrangement can be attached. Within the scope of the present invention, the term sensor signal is to be interpreted as broadly as possible and can comprise any desired change in the electrical current/or the voltage which changes on the basis of the movement. This change can be caused by a change in resistance along a current path or an inductive change or a change which is caused by Lorentz force. However, it can also be an optical signal which changes in a movement-induced fashion.

Exemplary embodiments of the invention solve the abovementioned technical problem by means of a sensor arrangement for directly sensing a rotation of at least one actuator of a transmission shift system.

In particular, a magnetic measuring principle can be used. For example, the first sensor element comprises a permanent magnet which generates a variable magnetic field with a rotation of the actuator, and the second sensor element is designed to generate the sensor signal in response to a change in the magnetic field.

In further exemplary embodiments, the sensor arrangement comprises an evaluation circuit and a housing. The second sensor element and the evaluation circuit can optionally be secured together with the housing on the mount (e.g. has an enclosed, encapsulated unit).

In further exemplary embodiments, the first sensor element and the second sensor element are part of an inductive or magnetic sensor which can have, for example, a (2-dimensional or 3-dimensional) Hall sensor or a magnetoresistive sensor. The magnetoresistive sensor can be, for example, a GMR (giant magnetoresistance) sensor, an AMR (anisotropic magnetoresistance) sensor, or a TMR (tunnel magnetoresistance) sensor.

The present invention is, however, not limited to a magnetic measuring principle. For example, in further exemplary embodiments the first sensor element and the second sensor element are coupled optically to one another, wherein the sensor element comprises a light source (e.g. a laser), a light sensor and geometric structures (e.g. slits) which interrupt the light signal as a function of the relative rotation.

In further exemplary embodiments, the sensor arrangement optionally comprises a transmission which couples the first sensor element to the actuator. It is therefore possible to convert a rotational angle range of the actuator to a relatively large angular range of the first sensor element, in order thereby to permit a relatively large angular resolution.

In further exemplary embodiments, the first sensor element is secured directly in a rotationally fixed fashion to the actuator without a coupling element such as, for example, a transmission.

In further exemplary embodiments, the sensor arrangement also comprises a temperature sensor for sensing a temperature in order to carry out a correction on the basis of the sensed temperature. The temperature sensor can be embodied as a separate component or can also be integrated in a chip. The sensing of the temperature is important, for example, in order to execute a shift process in a transmission in an optimal way. Apart from temperature-induced expansion, the consistency of a gear oil is also dependent on the temperature. The transmission controller can take these data into account and can evaluate a sensed rotational angle differently as a function of the temperature.

The present invention also relates to a sensor system which can be coupled to a control unit. The sensor system comprises (at least) one first sensor arrangement and (at least) one second sensor arrangement, such as have been defined above. Furthermore, the sensor system comprises a bus system which is designed to transmit data between the first and second sensor arrangements and the control unit. For this purpose, for example a universal interface can be used which can be employed for a plurality of sensors. Exemplary embodiments can therefore be adapted to various shifting concepts.

The present invention is also related to a manual transmission with a sensor arrangement or a sensor system such as have been defined above, and to a control unit. The actuator can optionally be a shift fork, and the control unit can be designed to control shifting of the manual transmission and to evaluate sensor signals of the sensor arrangement. The control unit can indicate, in particular, a shifted state of the manual transmission.

In further exemplary embodiments, the manual transmission comprises a further sensor which is designed to detect a movement of the shift fork, with the result that the further sensor and the sensor arrangement are redundant, in order to satisfy safety-relevant requirements.

In further exemplary embodiments, the manual transmission comprises a control unit which is designed to convert the sensed rotary sensor signal (which indicates a rotational angle) into a distance or a linear movement and in this way detect the position of a shift fork in the transmission. The conversion can be defined by way of a corresponding calibration in which a sensed rotational angle is assigned to a linear offset which ultimately brings about the shift process. This assignment can change over time, for example as a result of wear. This can be compensated by a software-based learning process. Furthermore, this assignment can also depend on the temperature (e.g. owing to thermal expansion), with the result that the sensed temperature can optionally be taken into account for this. Thus, different shifting concepts can easily be implemented.

The present invention also relates to a control device for a manual transmission of a utility vehicle, wherein the control device can comprise the sensor arrangement or can at least receive sensor signals from the sensor arrangement, in order to control the manual transmission on the basis of the sensed sensor signals and to activate actuators correspondingly.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
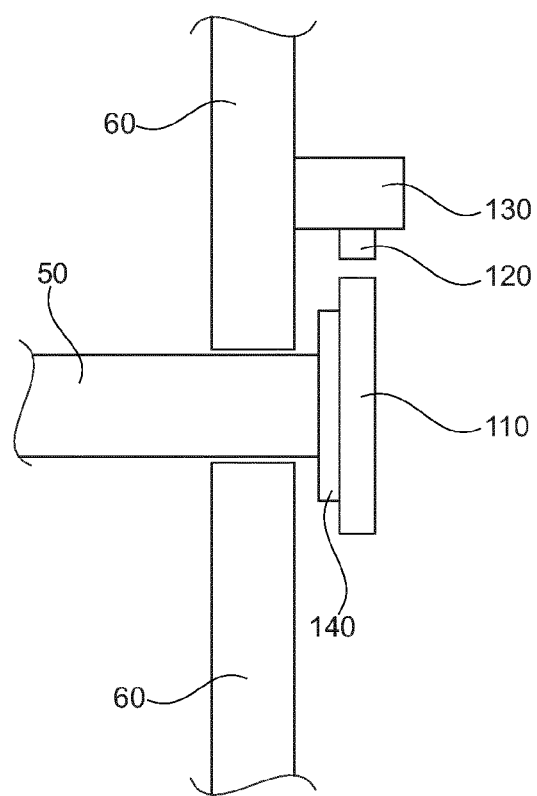
FIG. 1 shows a sensor arrangement according to an exemplary embodiment of the present invention.

FIG. 1 shows a sensor arrangement according to an exemplary embodiment of the present invention. The sensor arrangement is suitable for detecting angles of an actuator 50 which is rotatably arranged in a mount 60. FIG. 1 merely shows part of the actuator 50 which can be, for example, a rotational axis of a shift fork.

The sensor arrangement comprises a first sensor element 110 and a second sensor element 120, wherein the first sensor element 110 is preferably coupled free of play to the actuator 50. The result is that when the actuator 50 rotates, the first sensor element 110 also carries out a movement (relative to the mount 60). The second sensor element 120 is attached, for example, to the mount 60. Rotation of the actuator 50 relative to the mount 60 therefore brings about a relative movement between the first sensor element 110 and the second sensor element 120.

The first sensor element 110 can, for example, be fixedly attached to the actuator 50. However, a coupling element 140 (e.g. a transmission) can optionally be configured between the first sensor element 110 and the actuator 50, with the result that a rotational angle of the actuator 50 is made larger by the transmission 140. As a result, the first sensor element 110 rotates with a larger angular speed than the actuator 50 (a support, possibly necessary for this, on the mount 60 is not shown in FIG. 2). The measuring accuracy can therefore be increased.

A higher degree of angle measuring accuracy can optionally already be achieved by virtue of the fact that the radial extent of the first sensor element 110 is made larger (in that it is e.g. an enlarged disk such as is shown in FIG. 1). As a result, although the angular deflection is not made larger, the radial end points of the first sensor element 110 travel a larger distance during a rotation, and this larger distance is in turn more easily detectable.

The first sensor element 110 can be, for example, a magnet, and the second sensor element 120 can sense, for example, the magnetic field which is generated by the first sensor element 110. For example, the first sensor element 110 can generate a magnetic field whose field lines are not rotationally symmetrical about the rotational axis of the actuator 50 (otherwise it would be virtually impossible to detect the rotation). Rotation of the actuator 50 therefore brings about a change in the magnetic field, which change can be sensed, for example, inductively or as Lorentz force or magnetoresistively by means of the second sensor element 120. Accordingly, the second sensor element 120 can have, for example, a coil, a Hall sensor or a magnetoresistive sensor (e.g. GMR sensor, AMR sensor, TMR sensor, etc.).

The sensor arrangement can also have an evaluation unit 130 on which the second sensor element 120 can be attached. The evaluation unit 130 generates a sensor signal on the basis of the change in the magnetic field which is sensed by the second sensor element, which sensor signal indicates the angle of the actuating element 50.

Figure 2:
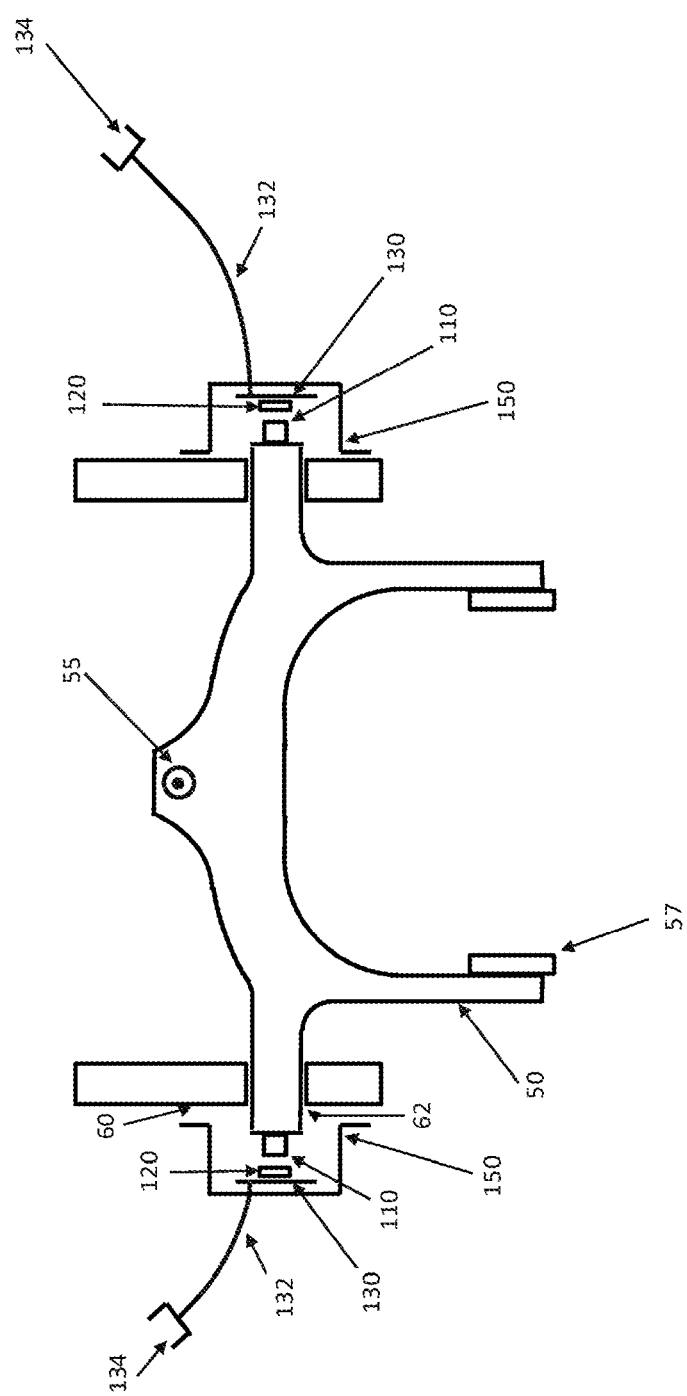
FIG. 2 shows the sensing of a tilt fork according to further exemplary embodiments.

FIG. 2 shows a sensing of a tilt fork according to further exemplary embodiments of the present invention. In the exemplary embodiment shown in FIG. 2, the actuator 50 is, for example, a shift fork of a manual transmission, which shift fork is embodied as a tilting fork.

The shift fork 50 (tilting fork) comprises a rotary bearing 62, a force point 55 and two fork ends, on each of which a sliding block 57 for implementing a shift process is formed.

The sliding blocks 57 engage, for example, in a shift sleeve (not shown) and thereby bring about a linear movement perpendicularly with respect to the plane of the drawing for shifting the manual transmission. The rotary bearing 62 defines a rotational axis about which the tilting fork 50 is rotatably held by the mount 60. The force point 55 serves as a point on which a force can act in order to rotate the exemplary shift fork 50.

In the exemplary embodiment shown in FIG. 2, the sensor arrangement comprises a housing 150 in which the second sensor element 120 and the evaluation circuit 130 are accommodated and are together attached on the mount 60. For example, the second sensor element 120 can be attached directly on the evaluation circuit 130 (e.g. a circuit board) or also directly on the housing 150. However, this is not necessarily the case. The evaluation circuit 130 can be coupled to a control unit (not shown in FIG. 2), for example, via a control line 132 and an optional plug 134. Sensor data from the second sensor element 120 can optionally also be passed on to the control unit via a wireless connection or via a bus line.

In this exemplary embodiment, the first sensor element 110 is directly connected in a rotationally fixed fashion to the shift fork 50, with the result that rotations of the shift fork 50 (relative to the mount 60) bring about relative movements between the first sensor element 110 and the second sensor element 120. The first (or second) sensor element can in turn comprise a magnet (permanent magnet or electric magnet) which can be arranged in such a way that rotation of the shift fork 50 relative to the mount 60 brings about a change in the magnetic field. The other sensor element can act as a magnetic sensor and can sense the changing of the magnetic field and generate a corresponding sensor signal.

For this magnetic sensing, the second sensor element 120 can have, for example, a coil or some other inductive means which is sensitive to a change in the magnetic field. It is also optionally possible for the second sensor element 120 to represent, together with the first sensor element 110, a magnetoresistive sensor. Within the scope of the present invention, a magnetoresistive sensor can be assumed to be any sensor which detects a change in resistance of an electrical current as a consequence of a change in the outer magnetic field. However, the sensor arrangement can also detect the rotation of the shift fork (actuator) 50 on the basis of the Hall effect (2D or 3D). The present invention is not limited to specific magnetic sensors. In further exemplary embodiments, the sensor arrangement can have an optical sensor in order to detect the rotation. For example, the first sensor element 110 can be a disk with slits which can optically be sensed. Furthermore, inductive measuring principles can also be used.

In further exemplary embodiments, the first sensor element 110 and the second sensor element 120 can be interchanged, i.e. the second sensor element can also be attached directly or indirectly on the actuator.

The advantages of the invention can be summarized as follows.

For the implementation of a transmission controller it is important to sense the position of the shift fork as precisely as possible. The closer the position sensor or a target (the first sensor element) can be attached for this purpose to the shift fork, the smaller the degree of falsification of the measurement signal by other influences such as, for example, sagging, elasticities, etc. of the components involved in the transmission of the force. Exemplary embodiments bring about a significant improvement in the control here, since, for example, the rotation can be sensed directly.

Furthermore, further functions can be implemented by using the sensor arrangement according to the invention. For example, information about the fork positions can be acquired over their service life. Sliding blocks 57 have, for example, a bronze material which can wear over time. This wear can become apparent in a change in the angular position (e.g. for an end position of a shift process). However, since a sufficient linear movement of the exemplary shift sleeve into which the sliding blocks 57 engage, for example, is important for a successful shift process, this wear can be taken into account by the transmission control unit (not shown).

In the case of a tilting fork, the shift fork is pivoted about an axis orthogonally with respect to a corresponding drive/output shaft axis. With precise sensing of the rotational position of the tilting fork and corresponding calibration (conversion into a linear movement, e.g. of the shift sleeve), separate linear sensing of the actuator travel is not necessary. The pivoting angle of the tilting fork can instead be sensed directly, and converted into the corresponding linear movement, which carries out the shift process, by using the calibration. A large part of the play-induced and elasticity-induced inaccuracies in the measuring chain which are otherwise present are therefore avoided. Exemplary embodiments therefore bring about, through the direct sensing of a rotational angle, significantly more precise sensing of the position of the shift fork, which in an overall improved controllability of the automated shifting and therefore contributes to increasing the efficiency of the drive train.

Aspects of exemplary embodiments of the present invention can also be summarized as follows.

Exemplary embodiments relate to a position sensor, in particular an angle sensor, which is attached by flanges to a bearing of a fork (actuator 50). For example a permanent magnet, which is connected in a rotationally fixed fashion to the shaft of the fork, can be taken as a target or an element whose rotation is to be sensed. For example, the following operating principles can be used as the sensor principle: magnetic (Hall, 3D Hall, GMR, AMR), inductive (e.g. PLCD—permanent magnetic linear contactless displacement), optical (incremental).

It is optionally also possible to use a transmission to convert the angular range of the fork to a relatively large angular range for the target. It is therefore possible to achieve the objective of bringing about a better angular resolution of the measuring system.

It is also possible to connect a plurality of sensors to one another by use of a bus system. Internal temperatures of the measuring element can also be output. Furthermore, a redundant design is possible for safety-relevant applications (e.g. detection of the fork position in the main transmission). This can be done, for example, by virtue of the fact that in each case a separate sensor arrangement is provided for the two rotatable mounts (rotational axes lying opposite one another).

The angle signal can be converted directly into a corresponding distance or a travel signal of the shift fork along the corresponding drive shaft axis or output shaft axis by means of calibration.

Exemplary embodiments permit easy adaptability to different shift fork concepts by way of a universal interface concept. The mechanical and/or electrical sensor connection can be disconnected, in particular, without destruction.

LIST OF REFERENCE NUMBERS

50 Actuator
55 Force pressure point
57 Sliding block
60 Mount
62 Rotary mount
110, 120 First, second sensor element
130 Evaluation circuit
132 Signal line
134 Plug-type connection
140 Transmission
150 Housing The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor system for detecting an angle of an actuator, wherein the actuator is rotatably arranged on two opposite mounts by respective bearings, wherein the sensor system is couplable to a control unit, the sensor system comprising:
   a first sensor arrangement configured to detect the angle of the actuator, the first sensor arrangement including
      a first sensor element which is couplable to the actuator to carry out a movement relative to a first mount of the two opposite mounts in response to a rotation of the actuator,
      a second sensor element which is securable in a rotationally fixed fashion to the first mount and is couplable to the first sensor element to generate a sensor signal when the actuator rotates and a resulting relative movement results between the first sensor element and the second sensor element, which sensor signal depends on the rotation carried out by the actuator,
      an evaluation circuit, and
      a housing,
      wherein
         the second sensor element and the evaluation circuit are securable together with the housing on the first mount as a closed unit, and
         the first sensor arrangement is configured to be attached at the respective bearing of the first mount of the actuator;
   a second sensor arrangement configured to detect the angle of the actuator, the second sensor arrangement including
      a further first sensor element which is couplable to the actuator to carry out a movement relative to a second mount of the two opposite mounts in response to a rotation of the actuator; and
      a further second sensor element which is securable in a rotationally fixed fashion to the second mount and is couplable to the further first sensor element to generate a sensor signal when the actuator rotates and a resulting relative movement results between the further first sensor element and the further second sensor element, which sensor signal depends on the rotation carried out by the actuator,
      a further evaluation circuit, and
      a further housing
      wherein
         the further second sensor element and the further evaluation circuit are securable together with the further housing on the second mount as a closed unit, and
         the second sensor arrangement is configured to be attached at the respective bearing of the second mount of the actuator; and
   a bus which is configured to transmit data between the first sensor arrangement and the second sensor arrangement and the control unit.

2. A manual transmission, comprising:
   a sensor system as claimed in claim 1, wherein the actuator is a shift fork of the manual transmission; and
   a control unit which is configured to control shifting of the manual transmission and to evaluate sensor signals of the sensor arrangement.

3. The manual transmission as claimed in claim 2, wherein
   the control unit is configured to convert the sensor signal into a distance and thereby determine the position of the shift fork in the manual transmission.

4. The sensor system as claimed in claim 1, wherein
   the first sensor element comprises a permanent magnet which generates a variable magnetic field with a rotation of the actuator, and
   the second sensor element is designed to generate the sensor signal in response to a change in the magnetic field.

5. The sensor arrangement as claimed in claim 1, wherein the first sensor element and the second sensor element are part of an inductive or magnetic sensor and comprises a Hall sensor or a magnetoresistive sensor.

6. The sensor arrangement as claimed in claim 1, further comprising:
   a transmission which couples the first sensor element to the actuator in order to convert a rotational angle range of the actuator to a relatively large angular range of the first sensor element, in order to permit a relatively large angular resolution.

7. The sensor arrangement as claimed in claim 1, wherein the first sensor element is secured in a rotationally fixed fashion to the actuator.

8. The sensor arrangement as claimed in claim 1, further comprising:
   a temperature sensor for sensing a temperature in order to carry out a correction based the sensed temperature.

* * * * *